United States Patent [19]

Wolf et al.

[11] 4,140,009

[45] Feb. 20, 1979

[54] FUEL CONSUMPTION MEASURING DEVICE

[76] Inventors: Dieter Wolf, Spitzenstrasse 5, 6000 Frankfurt, M.; Heinz Schultze, Wilhelminestrasse 6, 609 Russelsheim, both of Fed. Rep. of Germany

[21] Appl. No.: 734,617

[22] Filed: Oct. 21, 1976

[51] Int. Cl.² ............................................. G01F 9/02
[52] U.S. Cl. ......................................... 73/114; 73/229
[58] Field of Search ............... 73/114, 229, DIG. 11, 73/113; 250/233, 564

[56] References Cited

U.S. PATENT DOCUMENTS

| | | | |
|---|---|---|---|
| 3,005,550 | 10/1961 | Flanders et al. | 250/233 X |
| 3,512,600 | 5/1970 | Adams | 180/77 |
| 3,695,097 | 10/1972 | Michalowicz | 73/113 |
| 3,983,747 | 10/1976 | Morgan | 73/DIG. 11 X |

FOREIGN PATENT DOCUMENTS

| | | |
|---|---|---|
| 6750198 | 1/1969 | Fed. Rep. of Germany. |
| 2234680 | 2/1973 | Fed. Rep. of Germany. |
| 2129495 | 10/1974 | Fed. Rep. of Germany. |
| 2365137 | 2/1975 | Fed. Rep. of Germany. |

*Primary Examiner*—Jerry W. Myracle
*Attorney, Agent, or Firm*—Richard L. Schwaab

[57] ABSTRACT

The invention relates to a device for measuring fuel consumption of liquid-fuel engines with variable power yield depending on operating conditions, especially the fuel consumption of automotive engines, characterized by one fuel metering unit each for return fuel flow and/or forward fuel flow, consisting of: a pair of circular chambers; a freely rotating gear, located within each said chamber; tangentially arranged holes extending into each circular chamber and acting as entry and outlet ports for fuel; a light transmitting component, located in the wall of each chamber and closing the chambers in the zones of the teeth of a ring gear; an infra-red transmitter and an infra-red receiver external to each chamber on one optical axis with the light transmitting components; and a measuring circuit connected to each infra-red receiver, and including a pulse transformer and a comparison circuit.

12 Claims, 6 Drawing Figures

FUEL CONSUMPTION MEASURING DEVICE

The invention refers to a device for measuring the fuel comsumption of liquid-fuel engines, the power yield of which varies according to operating conditions, especially with fuel consumption of automotive engines.

In the case of one known apparatus of this kind, fuel measurement occurs by means of a device with two chambers for measuring quantities; the chambers are separated by a diaphragm, and magnetic valves transfer the running fuel back and forth between the chambers; after each chamber in turn is filled, the diaphragm is moved by the fuel, and activates the magnetic valves on the one hand, and a counter on the other.

In the case of another known apparatus, fuel measurement occurs by means of a measuring pipe governed by magnetic valves with an equalizing container of equal volume; the sinking liquid surface is traced by means of a reflecting light beam, and the required switching actions are triggered photo-electrically. Since timing is done simultaneously it is possible to then derive fuel consumption with respect to a unit of time or, within otherwise constant conditions of test, power etc.

The known apparatuses thus described have some disadvantages which substantially reduce their applications. Thus, for example the minimal quantity of flow-through which produces the smallest indicated measure of sufficient accuracy is about 10 cm$^3$; this entails undesirable long periods of measurement (of up to several minutes) in case of measuring very small quantities of flow-through of less than 0.1 liter/h. Another disadvantage is that the known gauges do not permit to measure consumption of injection systems with two different levels of pressure and such that the return flow cannot be shunted before the gauge. A further disadvantage, especially of the devices involving a material pipe, lies in their dimensions, as well as the fact that they measure by sensing a freely mobile liquid surface; this feature permits the use only in test stations and excludes a permanent installation in vehicles in an application as a gauge with a dash-board readout.

It is the purpose of the present invention to create a gauge for fuel consumption that produces accurate measurements in a short period of time for minimal quantities of flow-through, and which can be installed in vehicles with a dashboard display and which permits measurement of the consumption of carburetor-as well as fuel-injected engines.

The apparatus for which protection is sought consists of: one metering unit each for fuel transport and/or fuel return including
  (a) One gear which rotates freely in a circular chamber,
  (b) Holes, extending at a tangent into the circular chamber, and serving as inlets and outlets for fuel,
  (c) One component each for transmitting light, installed in the walls of the chamber in the area covered by the teeth of the ring gear,
  (d) One infra-red transmitter and infra-red receiver external of the chamber on one optical axis with the components for light transmission, and
  (e) One measuring unit connected to the infra-red receiver and consisting mainly of a pulse transformer or comparison circuit, respectively.

The invention provides, for the first time, a flow-through gauge which does not work intermittently on the basis of a given minimal quantity of fuel, but which produces exact values for quantities of less than 10 cm$^3$ and, hence, exact test results for times of test of much less than one minute. Because of the construction as a flow-through gauge with a comparison measure of return flow, it is possible to measure small quantities of 10 ml/h. and less, even though the device is dimensioned for large quantities; similarly, it can measure large quantities with a corresponding reduction of the measured return flow. The set operates with high degree of accuracy. The occurrence of errors, for example through a threshold, is excluded due to the increase flow-through in both metering units even with smallest quantities of consumption. The sets are small externally, and are thus suitable for a fixed installation in vehicles with connection to a dash-board indicator. The use of an infra-red transmitter to generate the measuring signal assures a valid measure even in case of coloured fuels.

The gauge applies the same methods to measuring fuel consumption of carburetor-as well as fuel-injected engines. To handle the latter type, it is only necessary to position a lock valve at the engine-side connector of the forward-flow meter unit and to open a direct connection between the return connector of the injection pump and the return metering unit; thus it is possible simply to switch the device from measuring carburetor engines to injection engines by closing, and respectively opening the two connections.

To exclude error due to air bubbles carried in the fuel, it is advantageous to insert, between the pump and forward-flow meter unit, a gas extractor chamber equipped with a magnetic valve governed by the level of liquid, for example, by change of resistance or capacitance. In the case of gauges for fuel-injected engines, or combined gauges, it is useful to equip the gas extractor chamber with an additional valve activated by a diaphragm, the pressure side of which is connected to the engine-side connector of the return meter unit, and the off-load chamber of which is connected with the tank-side connector of the return meter unit. By these means it is possible to limit the excess fuel delivered to the injector pump to remain below a maximum which can be adjusted at the diaphragm valve; as soon as the desired surplus quantity is exceeded the diaphragm valve opens, and thus the surplus quantity of fuel exceeding the maximum, can flow back to the tank, or fuel line, resp., while bypassing the metering units.

The electronic measuring unit consists, in its simplest form, of a simple pulse transforming circuit as a monostable vibrator, the input of which is connected with the infra-red receiver through a pnp transistor in emitter configuration, and with the infra-red transmitter over an npn transistor in collector configuration as well as a resistor. This arrangement produces a coupling between the infra-red tansmitter and receiver, which leads to a pulse to the transmitter that depends on the light signal received by the infra-red receiver, and hence to greater steepness of both flanks of the pulses originating from the infra-red receiver which are then used as input pulses for the mono-stable vibrator.

Moreover, it is useful to equip the pulse transformer with a calibrating circuit consisting essentially of a potentiometer, to adjust the width of pulses. This circuit permits compensation for unavoidable production tolerances of the metering gear which would entail a need to individually calibrate the indicator with respect to the corresponding metering unit. In configurations with only one metering unit e.g. as a gauge with indicator mounted in the dashboard of a vehicle with normally spirated engine, the indicator is connected directly to the mono-stable vibrator.

If the gauge is to be configured for comparison measures, i.e. with separate metering units for forward fuel flow and return flow of fuel, then an adjustment of pulse width is required to account for the return flow. The output sides of the pulse transformer are connected to a difference circuit over each of these circuits: a transistor stage for obtaining constant pulse amplitudes, a condenser stage to integrate over pulses, and an amplifier which transforms the impedance. The difference circuit produces the test voltage for the indicator. One of both transistor circuits may contain a variable resistor for calibration against the other stage; also, the difference circuit may be followed by a variable resistor to adjust the maximum of the output signal.

The invention is illustrated, by way of example, in the accompanying drawings, in which.

Figure 2:
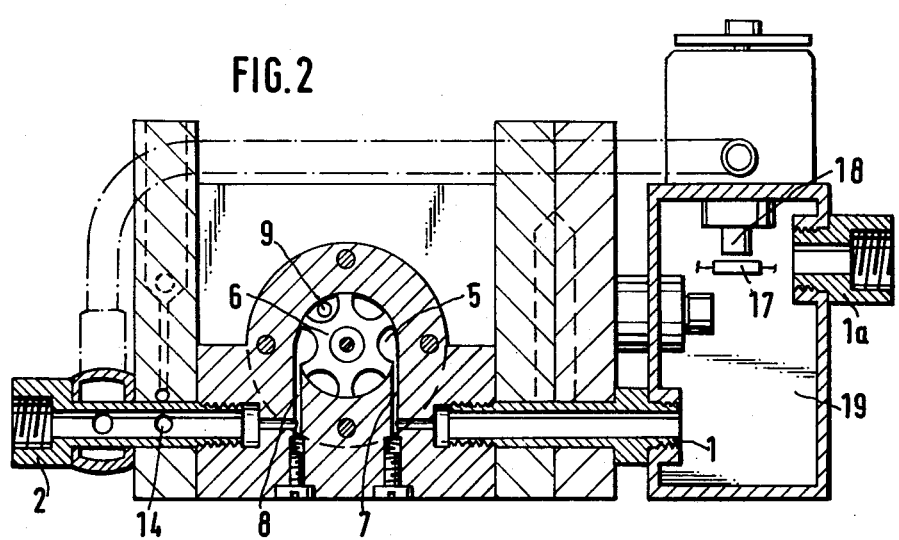
FIG. 2 is a cross section through FIG. 1 taken on the line A—A thereof.
Figure 3:
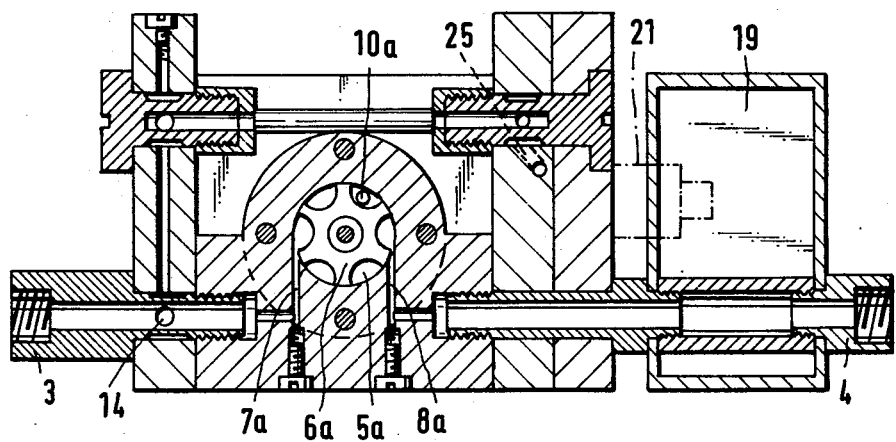
FIG. 3 is a cross section through FIG. 1 taken on the line B—B thereof.

Referring to the drawings, the combined gauge for measuring fuel consumption of carburetted engines or fuel-injected engines, respectively, includes pump-side forward flow connector indicated at 1, 1a, the engine side forward flow connector indicated at 2, the engine side return flow connector indicated at 3, and the tank-side return flow connector indicated at 4. The remainder of the unit consist of a flow-through metering unit each for forward and return flow, which consist (see FIGS. 2 and 3) of freely rotating gears 6, 6a positioned in a circular chamber 5, 5a, holes 7, 7a and 8a drilled at a tangent and opening into the circular chambers 6, 6a to form fuel entries and outlets into, and from, the chambers, one lens element 9, 10 and 9a, 10a each located in the wall of a chamber in the zones of the teeth of the gears 6, 6a; one infra-red diode 11, 11a; and one photo diode 12, 12a both of which are on the same optical axis as the lenses 9, 10 and 9a, 10.

The axes of the gear wheels are indicated at 13 and 13a. The engine-side connectors of both metering units are liquid-connected by means of a transverse aperture 14. A lock valve 15, 16, is positioned in the transverse hole 14 on the one hand, and the engine-side connector for the return from an injector pump 3, on the other hand.

Further, a gas extractor chamber 19 is installed ahead of the forward flow metering unit and is equipped with a magnetic valve 18 which is governed by a resistor 17. The gas extractor chamber 19 is equipped with a valve 21, activated by a diaphragm 20 (FIG. 1); the off-load chamber 22 of the valve 21 is connected by means of hole 23 with the tank-side connector of the return metering unit, and its pressure chamber 24 is connected with the engine-side connector 3 of the return metering unit by means of a hole 25.

The measuring device illustrated in the drawing operates as follows:

In the case of measurement of fuel consumption of carburetted engines, valve 15 is opened and connector 3 is closed by means of valve 16 or any other suitable method. Connector 1a is linked with the ouput sides of the fuel pump, connector 2 the carburetor, and connector 4 with the suction pipe of the fuel pump. Fuel entering through connector 1a is de-gassed in chamber 19, and any gas extracted (see FIG. 2) is collected in the dome of chamber 19 and escapes through valve 18. Opening of the magnetic valve 18 is governed by resistor 17 which triggers the switch through a change in resistance in response to a lowering of the liquid level below that of the resistor 17. Fuel flowing out of the extractor chamber 19 through forward flow inlet 1 and the tangential hole 7 into chamber 5, combined with the outflow of fuel through hole 8, rotates the gear wheel 6 with a speed proportional to the velocity of fuel flow; each time a tooth of the wheel crosses the optical axis, the infra-red signal is interrupted which triggers a pulse in the photo transistor. Hence, the number of pulses from the photo transistor is directly proportional to the volume of fluid flowing through the metering unit. By means of simple integration over pulses it is thus possible to determine the volume of fuel flowing through and to express it as a function of any suitable variable (time, distance, etc.). Such a gauge thus satisfies accuracy requirements for dashboard instruments.

In the case of the gauge shown in the drawing which produces comparison measures for separate forward and return flows, a volume of fluid reduced by the quantity consumed (flowing out of connector 2) is returned into the tank through the return flow measuring unit 5a–12a. This measuring unit (5a–12a) works on the same principle as the forward flow unit, so that the portion of fluid that has reached the carburetor through connector 2 can be computed from the difference of both measurements.

Measurement of consumption of fuel-injected engines occurs analogously, however, by means of a closed valve 15 and an open valve 16 and linking connector 3 with the return from the injector pump, the fuel flow is routed over the injector pump to the return flow metering unit instead of going directly through the transverse hole 14. In this case the diaphragm regulator is used to adjust the return flow corresponding to the excess flow to an arbitrary maximum value of, e.g., 35 liter/h. For this purpose the pressure which builds up in the return line in front of the metering unit (which acts as a restrictor) is transmitted over the connecting line 25 (FIGS. 1 and 3) to the pressure chamber 24 of the diaphragm valve; as soon as it exceeds the closing force of, e.g., 0.1 atu, which is pre-set at the diaphragm valve 21, the pressure opens valve 21 and thereby opens the gas extractor 19 through the relief chamber 22 and hole 23 to give access to the return line. As a result, fuel is diverted directly to the tank with a corresponding reduction of the forward flow and the return quantity, until valve 21 closes again in response to falling pressure in the return line and in pressure chamber 24.

Figure 1:
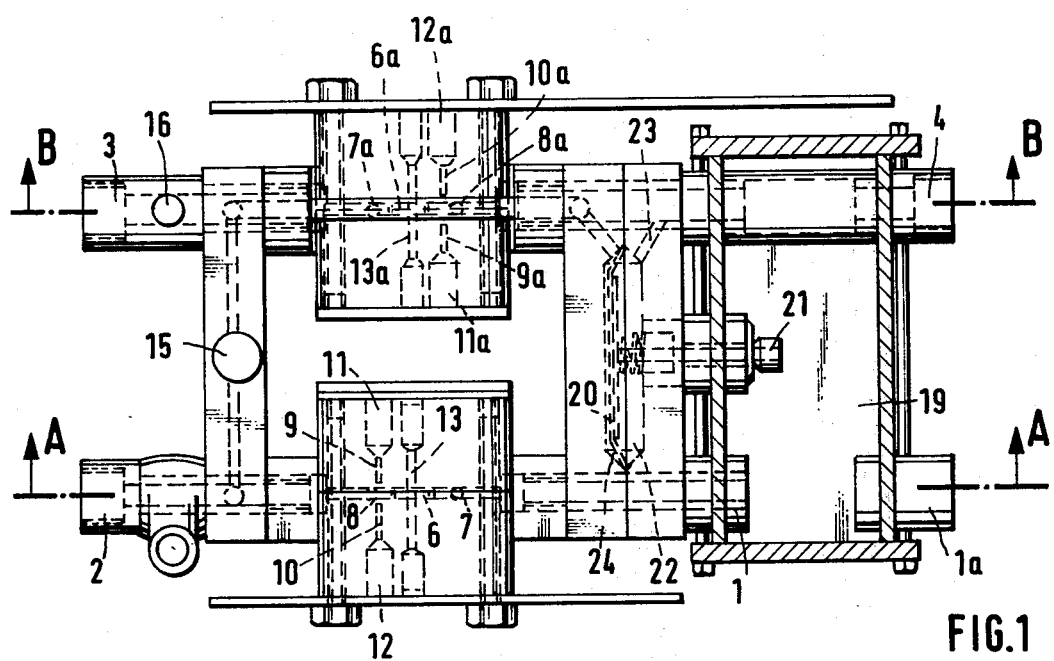
FIG. 1 is a plan view of the measuring device for the combined measuring of fuel consumption of carburetted or fuel-injected engines.
Figure 4:
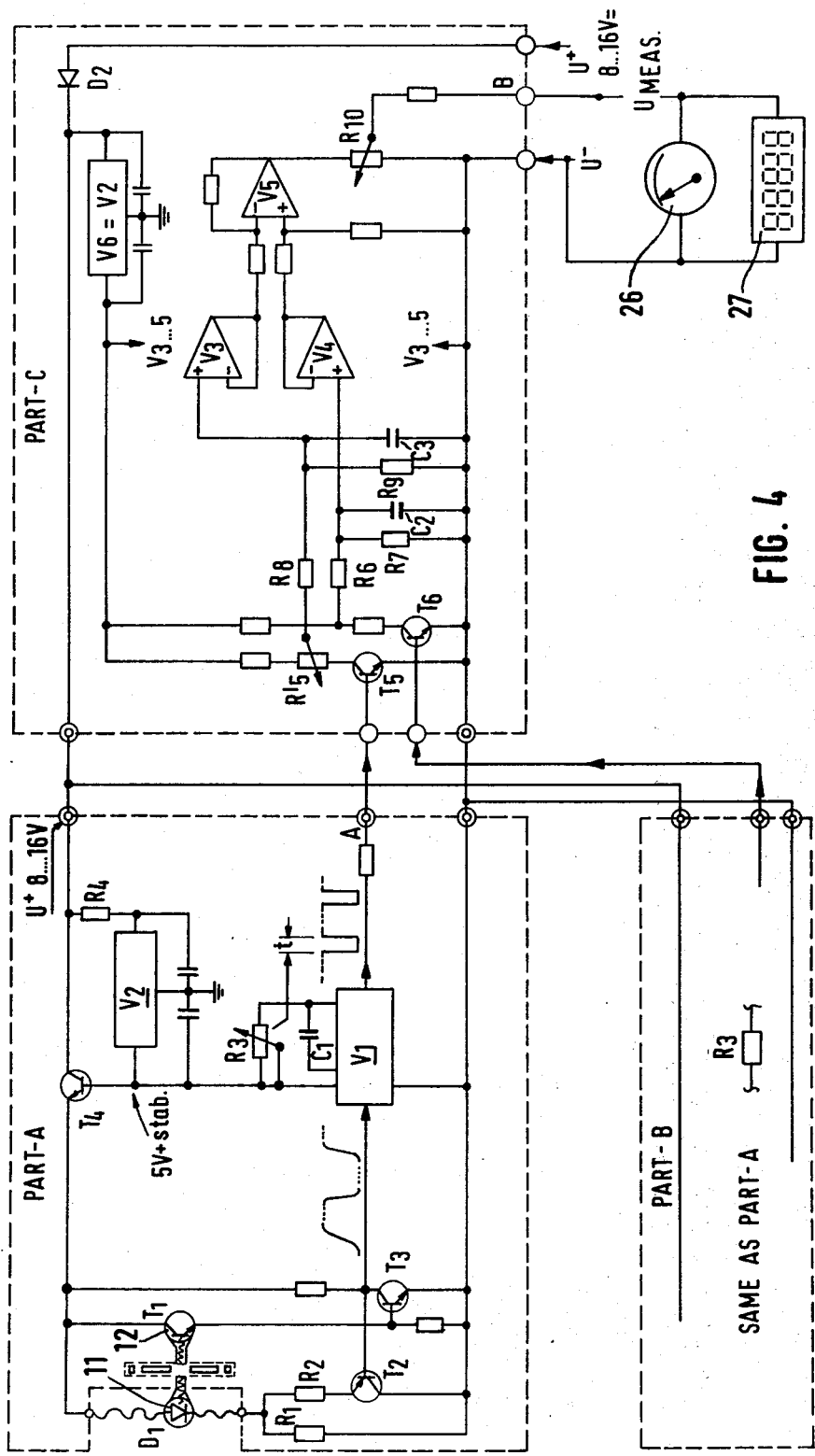
FIG. 4 is a circuit diagram designed to evaluate metering results.

Referring to FIG. 4, the infra-red diode ($D_1$) and photo transistor ($T_1$) of the forward flow metering unit are identified with the same reference numbers as in FIG. 1. The photo transistor 12 is connected through transistor $T_3$ in an emitter configuration with a mono-stable vibrator $V_1$, such that transistor $T_2$ with input resistor $R_2$ is coupled; transistor $T_2$ is in a collector configuration in series with the infra-red diode. Coupling of transistors $T_2$ and $T_3$ causes a current to flow through the infra-red diode the change of which is proportional to the light intensity at the photo transistor $T_1$, leading to a change in the steepness of pulses from the photo transistor, which are otherwise closer to sine form. The pulses, which are still in approximate wave form are converted to rectangular pulses by the mono-stable vibrator $V_1$; the potentiometer $R_3$ which is in parallel with the vibrator $V_1$ permits to calibrate the width of pulses to compensate for unavoidable production variability in the speed of measuring wheels.

The measuring circuit for return flow is analogous — it is not shown in detail but identified as "Part B." The only difference is that for Part B, a calibration for production tolerances is not required, as the adjustment occurs only with respect to the relationship of both fuel metering units.

The constant-time rectangular pulses produced by the mono-stable vibrator $V_1$ of both metering units are integrated separately in one condenser circuit each ($R_6$, $R_7$, $C_2$, resp. $R_8$, $R_9$, and $C_3$), connected over transistors $T_5$, resp. $T_6$, which are used for ensuring constant pulse amplitude; the condensor circuits are linked with the comparison circuit $V_5$ over one amplifier each $V_3$, resp. $V_4$ which transforms impedances. The comparison circuit $V_5$ produces an output voltages at both condensors; this is the test voltage for the indicator which may be an analogue meter 26 or a digital indicator 27.

The potentiometer $R_5$ in the integrating circuit $T_5$, $C_3$, $R_9$, $V_3$ serves to calibrate the entire stage, whereas the variable resistor $R_{10}$ in the output circuit permits to adjust the maximum with respect to the final indicator, thus allowing for a simple calibration.

The modules of circuitry identified in the diagram as Parts A, B and C are individually tested modules, each of which has a voltage regulator $V_2$, resp. $V_6$. In case of application of the unit as a flow gauge for large quantities it will be sufficient to connect module Part A. For simple reading of quantities, it is sufficient to connect this output to a pulse counter with digital read-out, however, one may also link up an integrator to obtain a test voltage suitable for analogue read-out.

Figure 5A:
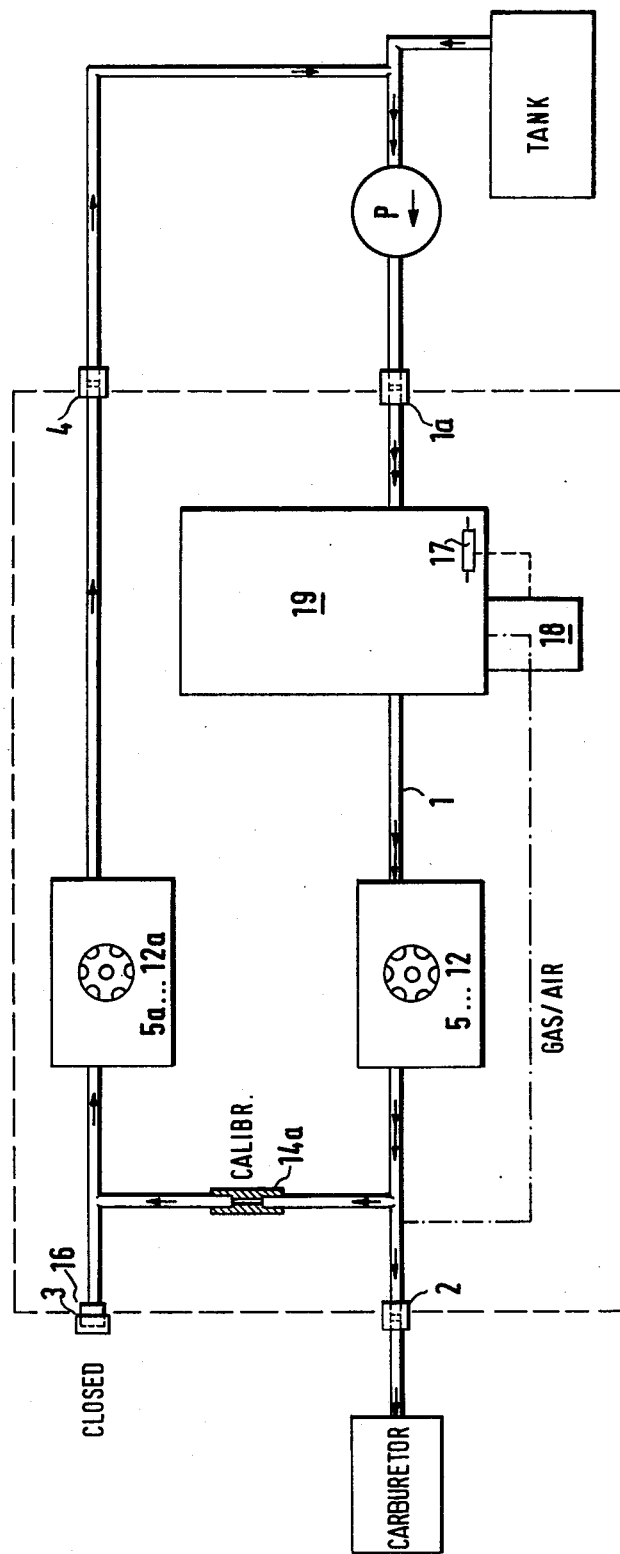
FIGS. 5a and 5b are block diagrams or one individual gauge each for measuring of carburetted engines and fuel injected engines respectively.
Figure 5B:
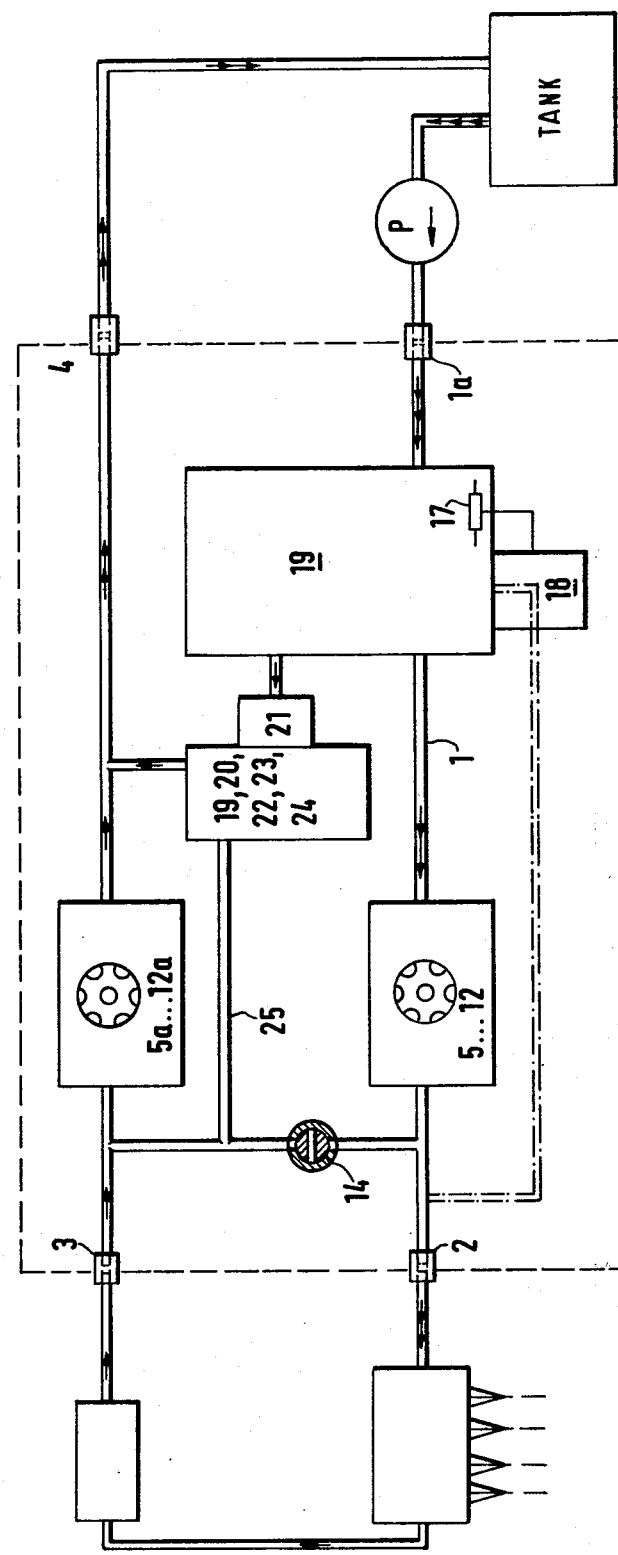

The drawing illustrates the invention by way of a combined gauge for measuring consumption of carburetted and fuel-injected engines. However, it is also possible to design individual gauges to measure either carburetted or fuel injected engines, to be used as bench sets or in dashboard applications in vehicles. In that case the device is simplified in that only the parts required for the task are included. FIG. 5 illustrates, similarly to FIG. 1, one device each for carburetted (5a) and fuel-injected (5b) engines by means of block diagrams, using reference numbers corresponding to those employed in FIG. 1. The only difference is that the gauge for carburetted engines has in place of the lock valve, a calibrated hole or restrictor 14a; since the return flow is also constant and calibrated, a metering unit in the return flow can be dispensed with. The measuring circuitry computes the actual forward flow against a pre-set volume representing the return flow within the circuit and which corresponds to the calibrated return flow.

We claim:

1. Apparatus for measuring the fuel consumption of liquid-fuel engines with a variable power yield dependent on operating conditions, especially the fuel consumption of automotive engines, comprising:
   a. a fuel metering unit connected to a forward fuel flow line and a fuel metering unit connected to a return fuel flow line, each of said fuel metering units comprising:
      i. a circular chamber;
      ii. a freely rotating wheel gear located within each chamber;
      iii. tangentially arranged holes extending into each circular chamber acting as entry and outlet ports for fuel;
      iv. a light transmitting component, located in the wall of each chamber and closing the chambers in the zones of the teeth of said wheel gear;
      v. an infra-red transmitter and an infra-red receiver external to each chamber on one optical axis with the light transmitting component; and
      vi. a pulse transformer connected to each infra-red receiver which converts the output from each infra-red receiver into a pulse proportional to fuel flow through each fuel metering unit; and
   b. a comparison circuit connected to the pulse transformer of each fuel metering unit for producing a net output proportional to fuel consumption convertible by an indicator into a fuel consumption reading.

2. The apparatus of claim 1, further comprising a gas extractor chamber having a magnetic valve governed by the level of fuel provided forward of the pump-side of a connector of the forward flow metering unit.

3. The apparatus of claim 2, wherein said gas extractor chamber is equipped with an additional diaphragm activated valve, the pressure side of which is connected with the engine side of a further connector of the return flow metering unit and the relief chamber of which is linked to the tank-side of an additional connector of the return flow metering unit.

4. The apparatus of claim 1, wherein the pulse transformer comprises a mono-stable vibrator, the input side of which is connected over a pnp transitor in emitter configuration with the infra-red receiver and with the infra-red transmitter over a npn transistor coupled with an input resistor in collector configuration.

5. The apparatus of claim 4, wherein said pulse transformer further comprises a potentiometer connected in parallel to the mono-stable vibrator for adjusting pulse width.

6. The apparatus of claim 1, wherein said comparison circuit comprises an integration circuit connected to the pulse transformer of each fuel metering unit, and a difference circuit for transforming the output from each integration circuit into a net output for use by an indicator.

7. The apparatus of claim 6, wherein each of said integration circuits comprises a condenser circuit for each fuel metering unit connected over a transitor stage for obtaining constant pulse amplitudes, and an amplifier connected to each condenser circuit for transforming impedances.

8. The apparatus of claim 6, wherein a variable resistor is installed in the integration circuit for the forward fuel flow metering unit for calibration of the entire stage, and the difference circuit is followed by a variable resistor for adjusting the maximum output voltage.

9. A fuel metering device for measuring the fuel consumption of liquid-fuel engines with a variable power yield dependent on operating conditions, especially the fuel consumption of automotive engines, comprising:
   a. a circular chamber;
   b. a freely rotating wheel gear located within said chamber;

c. tangentially arranged holes extending into said circular chamber acting as entry and outlet ports for fuel;
d. a light transmitting component, located in the wall of said chamber and closing the chamber in the zone of the teeth of said wheel gear;
e. an infra-red transmitter and an infra-red receiver external to said chamber on one optical axis with the light transmitting component; and
f. a pulse transformer connected to said infra-red receiver which converts the output from said infra-red receiver into a pulse proportional to fuel flow through said circular chamber for conversion by an indicator into a fuel consumption reading.

10. The fuel metering device of claim 9, further comprising a gas extractor chamber having a magnetic valve governed by the level of fuel provided forward of the pump-side of a connector of said circular chamber.

11. The fuel metering device of claim 9, wherein the pulse transformer comprises a mono-stable vibrator, the input side of which is connected over a pnp transitor in emitter configuration with the infra-red receiver and with the infra-red transmitter over a npn transitor coupled with an input resistor in collector configuration.

12. The fuel metering device of claim 11, wherein said pulse transformer further comprises a potentiometer connected in parallel to the mono-stable vibrator for adjusting pulse width.